United States Patent
Yasui

(10) Patent No.: US 8,149,883 B2
(45) Date of Patent: Apr. 3, 2012

(54) DATA RECEIVING DEVICE, DATA RECEIVING METHOD, AND COMPUTER PRODUCT

(75) Inventor: Tetsuya Yasui, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 136 days.

(21) Appl. No.: 11/845,927

(22) Filed: Aug. 28, 2007

(65) Prior Publication Data
US 2008/0107137 A1    May 8, 2008

(30) Foreign Application Priority Data
Nov. 7, 2006   (JP) .................. 2006-301803

(51) Int. Cl.
*H04J 3/06*   (2006.01)
(52) U.S. Cl. ...................................... 370/516
(58) Field of Classification Search ............ 370/516, 370/518; 375/371, 373, 374, 376
See application file for complete search history.

(56) References Cited

U.S. PATENT DOCUMENTS

| | | | |
|---|---|---|---|
| 5,790,543 A * | 8/1998 | Cloutier .................. | 370/252 |
| 6,049,886 A * | 4/2000 | Motoyama ............... | 713/400 |
| 6,531,926 B1 * | 3/2003 | Pate et al. ............... | 331/17 |
| 7,116,712 B2 * | 10/2006 | Vogelaar et al. ......... | 375/240.03 |
| 2008/0019398 A1 * | 1/2008 | Genossar et al. ......... | 370/498 |

FOREIGN PATENT DOCUMENTS
JP   11-308203   5/1999
JP   2006-148227   8/2006
* cited by examiner

*Primary Examiner* — Jason Mattis
*Assistant Examiner* — Stephen J Clawson
(74) *Attorney, Agent, or Firm* — Katten Muchin Rosenman LLP

(57) ABSTRACT

In a receiving device, time information is separated from received multimedia data, a first difference is calculated between two consecutive pieces of time information, and a second difference is calculated between reception timings of the two consecutive time information. Jitter is calculated from the first difference and the second difference, and a clock for reproducing the multimedia data is adjusted based on the calculated jitter.

8 Claims, 12 Drawing Sheets

DATA RECEIVING DEVICE, DATA RECEIVING METHOD, AND COMPUTER PRODUCT

BACKGROUND OF THE INVENTION

1. Field of the Invention

The present invention relates to a technology for reproducing video data and audio data received via a network.

2. Description of the Related Art

Communication system are know in the art that can transmit video data or audio data (hereinafter, "multimedia data") to other device on a network, receive multimedia data from other device on a network and reproduce the received data. In such a communication system, a communication device on the transmitting side (hereinafter, "transmitting device") transmits multimedia data to a communication device on the receiving side (hereinafter, "receiving device"). In this configuration, however, it is necessary to accurately synchronize the operating clocks of the transmitting device and the receiving device.

Japanese Patent Application Laid-Open No. H11-308203 discloses a first conventional technology for synchronizing operating clocks between the transmitting device and the receiving device. In the first conventional technology, the transmitting device multiplexes time information on the multimedia data and transmits the time-information-multiplexed multimedia data to the receiving device.

Japanese Patent Application Laid-Open No. 2006-148227 discloses a second conventional technology for synchronizing operating clocks between the transmitting device and the receiving device. In the second conventional technology, the receiving device temporarily stores the multimedia data received from the transmitting device in a buffer, and adjusts its own operating clock by monitoring a usage of the buffer.

The first conventional technology requires that the time information be transmitted at accurate time intervals. However, in typical networks, such as the Internet, sometimes there are large variations in data transmission timings (hereinafter, "jitter"). If such a jitter occurs, time information can not be transmitted at accurate time intervals, so that problems such as image jump, color drift, audio delay, and audio traverse occur.

In the second conventional technology, the multimedia data is first stacked in a buffer and the multimedia data is read from the buffer while adjusting the operating clock. Thus, there is higher possibility of correcting the operating clocks because the buffer can function as an agent to absorb the jitter to some extent. The second conventional technology, however, can not cope with larger jitters.

SUMMARY OF THE INVENTION

It is an object of the present invention to at least partially solve the problems in the conventional technology.

According to an aspect of the present invention, there is provided a receiving device that receives multiplexed multimedia data including multimedia data multiplexed on time information from a transmitting device via a network and reproduces the multimedia data in real time. The receiving device includes a clock generating unit that generates a clock; a buffer that temporarily stores therein the received multiplexed multimedia data; a first difference-calculating unit that calculates a first difference between timings of two consecutive pieces of time information in the received multiplexed multimedia data; a second difference-calculating unit that calculates a second difference between receiving timings of two consecutive pieces of time information at the receiving device; a jitter calculating unit that calculates a jitter in the network, by subtracting amount of data variation caused by a variation of the clock generated by the clock generating unit from data amount of the multimedia data transmitted in a period corresponding to a third difference between the first difference and the second difference; and a control unit that controls the clock generating unit to keep constant a value obtained by subtracting the jitter from data amount accumulated in the buffer.

According to another aspect of the present invention, there is provided a method of receiving multiplexed multimedia data, including multimedia data multiplexed on time information, at a receiving device from a transmitting device via a network, and reproducing the multimedia data in real time at the receiving device. The method includes generating a clock by a clock generating unit; temporarily storing the received multiplexed multimedia data in a buffer; calculating a first difference between timings of two consecutive pieces of time information in the received multiplexed multimedia data; calculating a second difference between receiving timings of two consecutive pieces of time information at the receiving device; calculating a jitter in the network, by subtracting amount of data variation caused by a variation of the clock generated by the clock generating unit from data amount of the multimedia data transmitted in a period corresponding to a third difference between the first difference and the second difference; and controlling the clock generating unit to keep constant a value obtained by subtracting the jitter from data amount accumulated in the buffer.

According to still another aspect of the present invention, there is provided a computer-readable recording medium that stores therein a computer program that causes a computer to realize the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the following embodiments, the present invention is applied to a system in which video data is transmitted from a transmitting device to a receiving device in real time via a network. However, the present invention can also be applied to a system in which any type of multimedia data, such as audio data, is transmitted.

Figure 11:
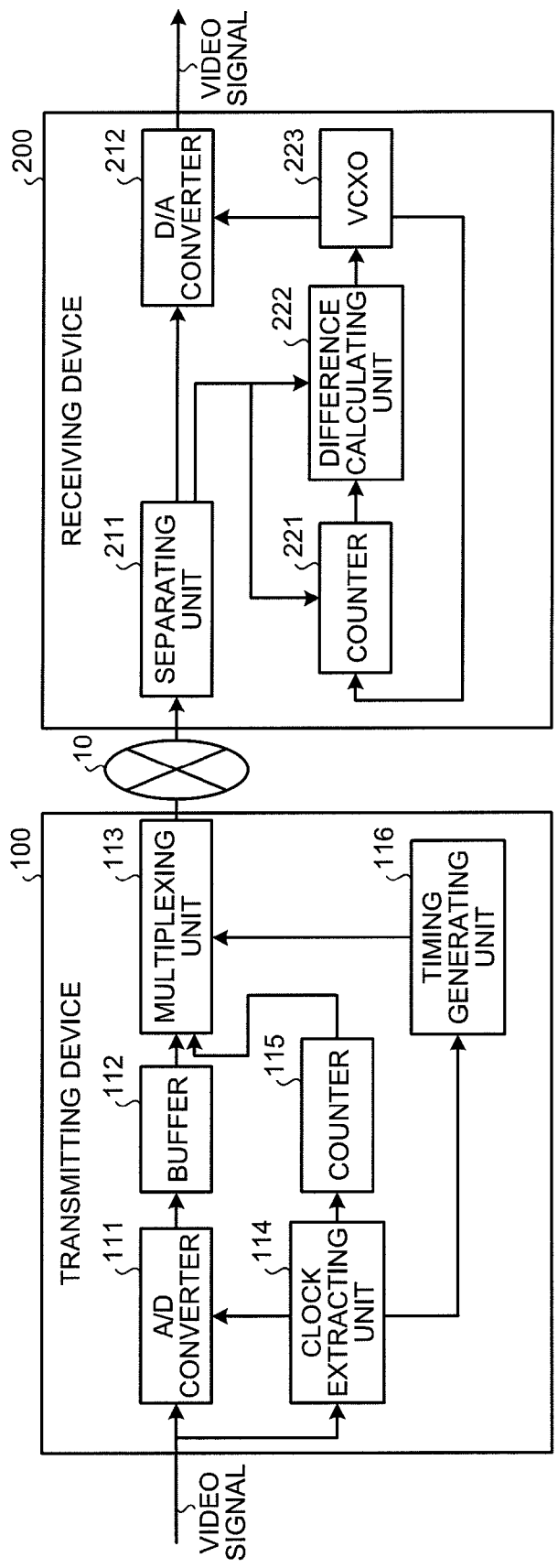
FIG. 11 is a block diagram of a conventional data transmission system.

A conventional transmitting device and a conventional receiving device are explained below. FIG. 11 is a block diagram of an example of the conventional data transmission system. The conventional data transmission system includes a transmitting device 100 and a receiving device 200 that are connected via a network 10. In this data transmission system, it is possible to transmit video data from the transmitting device 100 to the receiving device 200 and play the video data in real time.

The transmitting device 100 converts a video signal into video data and transmits the video data to the receiving device 200 via the network 10. The transmitting device 100 includes an analog/digital (A/D) converter 111, a buffer 112, a multiplexing unit 113, a clock extracting unit 114, a counter 115, and a timing generating unit 116.

The A/D converter 111 converts an input analog video signal into a digital video data. The buffer 112 is a memory that temporarily stores therein the A/D-converted video data. The multiplexing unit 113 multiplexes a count value of the counter 115 as time information on the A/D-converted video data stored in the buffer 112 and transmits the count-value multiplexed video data to the network 10.

The clock extracting unit 114 extracts a clock from the input video signal. The clock extracting unit 114 inputs the extracted clock to the A/D converter 111 as a sampling clock for sampling the video signal. Moreover, the clock extracting unit 114 inputs the extracted clock to the counter 115 and the timing generating unit 116. Based on the clock, the counter 115 determines elapsed time, while the timing generating unit 116 determines a timing at which the multiplexing unit 113 is to transmit the count-value multiplexed video data to the receiving device 200.

The counter 115 increments the count value every time it receives the clock from the clock extracting unit 114, and counting a time elapsed (elapsed time) from a certain time point. The timing generating unit 116 notifies a timing at which the multiplexing unit 113 is to transmit the count-value multiplexed video data to the receiving device 200. The multiplexing unit 113 transmits the count-value multiplexed video data to the multiplexing unit 113 at the timing received from the timing generating unit 116.

The receiving device 200 receives the count-value multiplexed video data from the transmitting device 100, converts the count-value multiplexed video data into the video signal, and outputs the video signal to outside. The receiving device 200 includes a separating unit 211, a digital/analog (D/A) converter 212, a counter 221, a difference calculating unit 222, and a voltage controlled crystal oscillator (VCXO) 223.

The separating unit 211 separates video data and time information from the count-value multiplexed video data. The D/A converter 212 converts the digital video data into an analog video signal.

The counter 221 increments a count value every time it receives a clock from the VCXO 223. When the counter 221 receives a notice of separation, indicative of completion of separation of time information from video data, from the separating unit 211, the counter 221 notifies the current count value to the difference calculating unit 222.

The difference calculating unit 222 calculates a difference between the clocks of the transmitting device 100 and the receiving device 200 by comparing the time information separated by the separating unit 211 with the count value received from the counter 221, and controls the VCXO 223 to compensate for the difference.

The VCXO 223 is a clock generator capable of generating a clock of desired frequency within a predetermined range of frequencies. The VCXO 223 inputs the generated clock to the D/A converter 212 and the counter 221. Based on the clock, the D/A converter 212 reproduces the video signal, while the counter 221 synchronizes its own clock.

Figure 12:
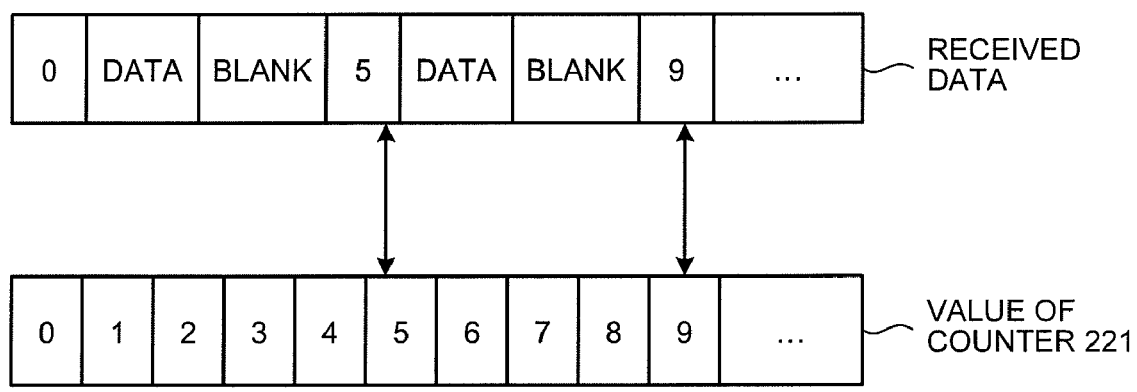
FIG. 12 is a schematic diagram for explaining a concept of a conventional clock correction method.

FIG. 12 is a schematic diagram for explaining a concept of a clock correction method performed by the conventional data transmission system shown in FIG. 11. As shown in FIG. 12, the count-value multiplexed video data received by the receiving device 200 contains video data, blanks, and time information. A blank is portions with no signal. The time information is represented by values such as "0", "5", "9", . . . , that indicate the number of clocks counted from a certain time point to a time of a transmission of the time information.

The difference calculating unit 222 compares the time information extracted from the count-value multiplexed video data with the count value of the counter 221 at the timing of a data transmission and controls the VCXO 223 to maintain the difference between the time information and the count value substantially constant. As a result, the clock of the transmitting device 100 can be synchronized with the clock of the receiving device 200.

However, the above method is employed based on an assumption that the receiving device 200 receives the time information from the transmitting device 100 at the same interval as the interval used for a transmission of the time information from the transmitting device 100. Therefore, the above method is suitable exclusively for a synchronous network in which a transmission speed is stable, and not suitable for an asynchronous network with a large jitter, such as the Internet.

Figure 13:
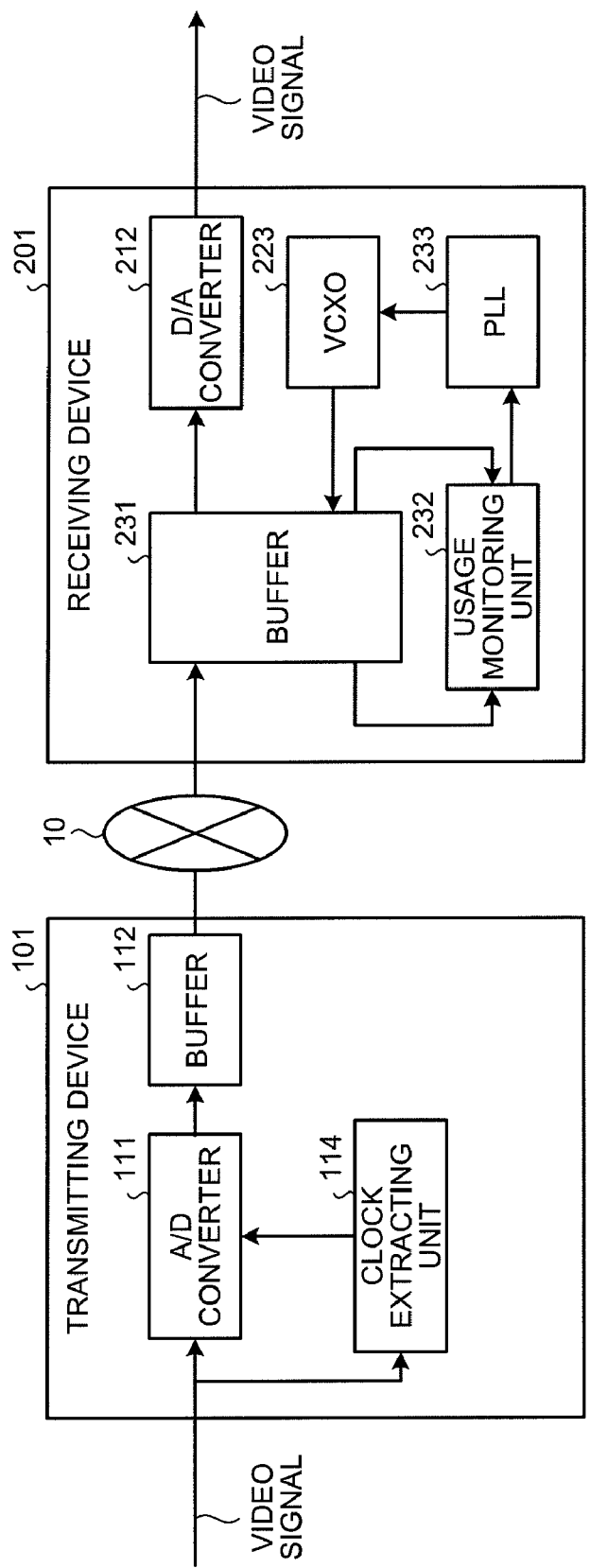
FIG. 13 is a block diagram of another conventional data transmission system.

FIG. 13 is a block diagram of another example of the conventional data transmission system. The data transmission system includes a transmitting device 101 and a receiving device 201 that are connected via the network 10. In this data transmission system, it is possible to transmit video data from the transmitting device 101 to the receiving device 201 and play the video data in real time.

The transmitting device 101 converts a video signal into video data and transmits the video data to the receiving device 201 via the network 10. The transmitting device 101 includes the A/D converter 111, the buffer 112, and the clock extracting unit 114.

The A/D converter 111 converts an input analog video signal into a digital video data. The buffer 112 is a memory that temporarily stores therein the A/D-converted video data. The clock extracting unit 114 extracts a clock from the input video signal. The buffer 112 transmits the A/D-converted video data to the receiving device 201.

The receiving device 201 includes the D/A converter 212, the VCXO 223, a buffer 231, a usage monitoring unit 232, and a phase locked loop (PLL) 233. The buffer 231 is a memory that temporarily stores therein the A/D-converted video data received from the transmitting device 101, and transmits the stored video data to the D/A converter 212 in a first-in, first-out method, at a rate based on the clock received from the VCXO 223.

The usage monitoring unit 232 monitors an amount of video data input into the buffer 231 and an amount of the video data output from the buffer 231, and controls the VCXO 223 to maintain the amount of the video data in the buffer 231 constant. The PLL 233 is a circuit that prevents variations in the control performed by the usage monitoring unit 232.

In this manner, in the data transmission system shown in FIG. 13, the clock is controlled so that a memory usage of the buffer 231 becomes constant. In the above system, data amount transmitted in a period with a certain length can be maintained substantially constant even in the asynchronous network. Accordingly, it is possible to reproduce the video data in real time in a desired quality even in network lines having a number of jitter, such as the Internet.

Figure 14:
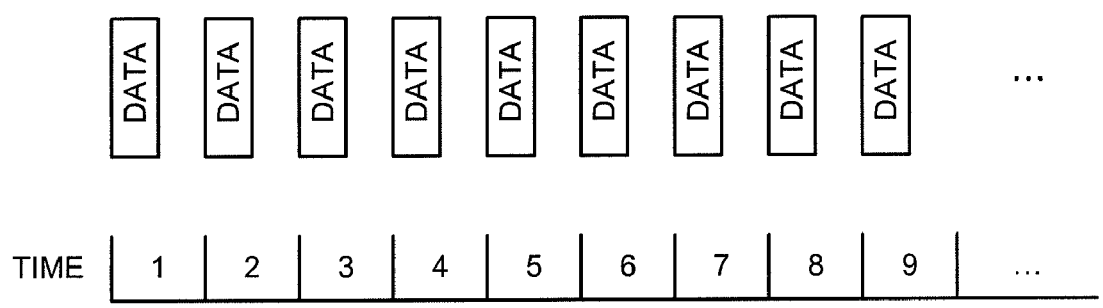
FIG. 14 is a schematic diagram for explaining a case in which data is transmitted at an even interval in the conventional data transmission system.
Figure 15:
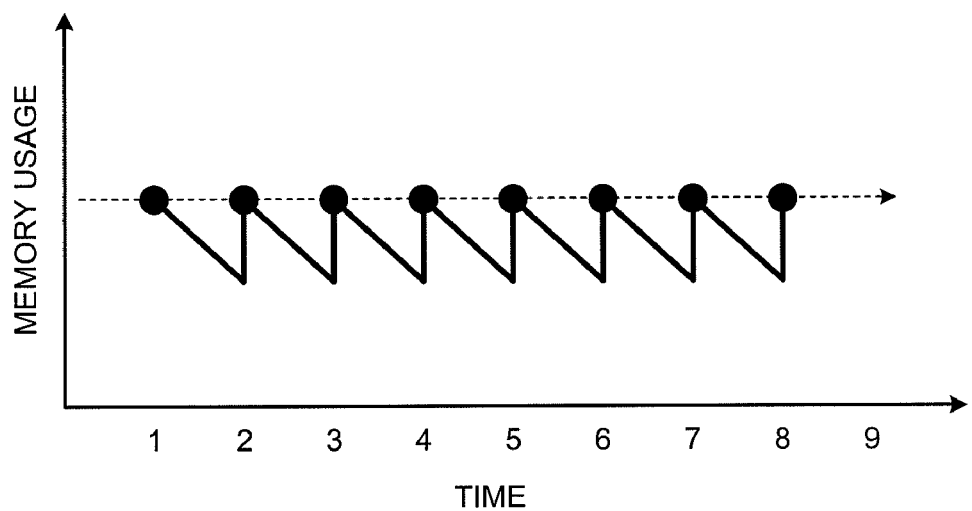
FIG. 15 is a schematic diagram for explaining a buffer state in the case shown in FIG. 14.

An example of an operation of the receiving device 201 is explained below. Assume now that, as shown in FIG. 14, the receiving device 201 receives the A/D-converted video data at even interval. In this example, the memory usage of the buffer 231 continuously changes, i.e., the memory usage temporarily and suddenly increases at a timing of data reception and gradually decreases at a constant rate as shown in FIG. 15 until the next timing of data reception.

Sometimes data is written in bursts into the buffer 231. To cope with this, the usage monitoring unit 232 is caused to read the memory usage at the timing of data reception instead of data output. In other words, the usage monitoring unit 232 reads out the memory usage at each of timings represented by black solid circles shown in FIG. 15, and determines a control value of the VCXO 223. In the example shown in FIG. 15, the black solid circles are aligned on a line, which indicates that the control of the VCXO 223 is stable.

Although a case has been explained above in which it has been assumed that the receiving device 201 receives the A/D-converted video data at even interval, slight variations in the interval are allowable.

On the contrary, in the asynchronous network, such as the Internet, the intervals of data reception widely vary due to congestion of communication. In such a case, the above method is not able to prevent a deterioration of the quality of the video data.

Figure 16:
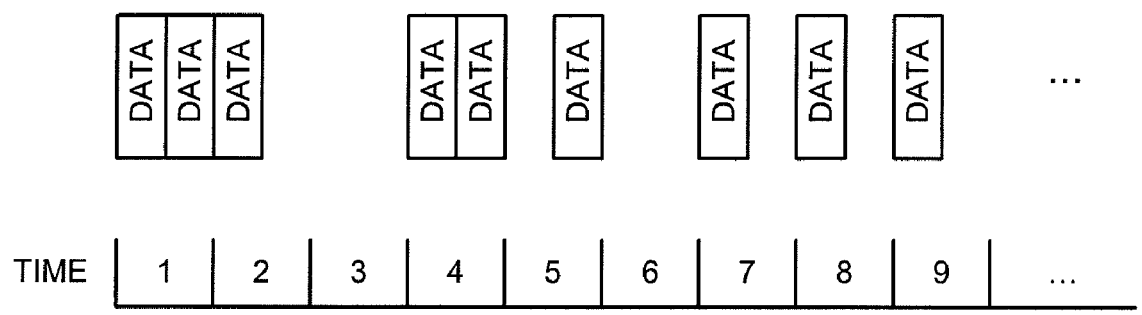
FIG. 16 is a schematic diagram for explaining a case in which data is transmitted at an uneven interval in the conventional data transmission system.
Figure 17:
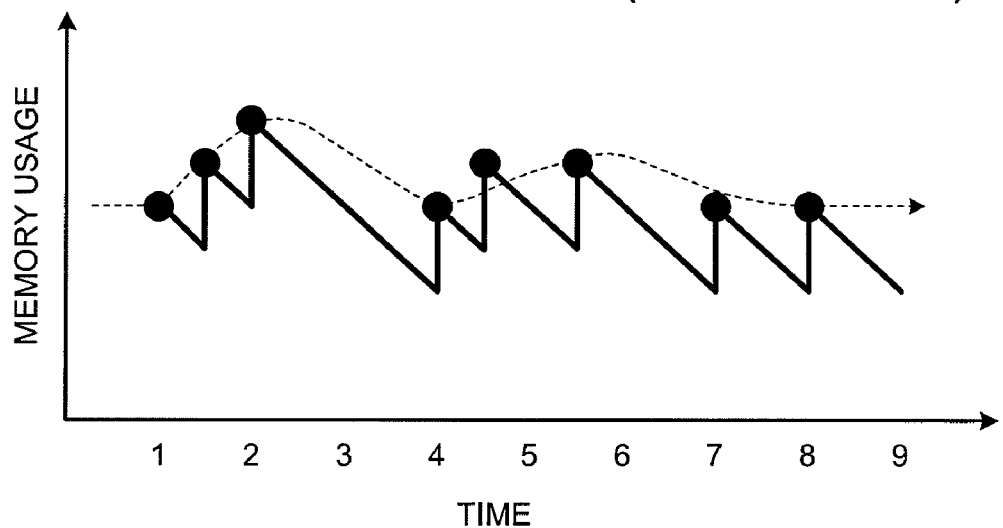
FIG. 17 is a schematic diagram for explaining a buffer state in the case shown in FIG. 16.

For example, if the interval is shorter than normal as shown in FIG. 16, a read time for a short interval is also shortened, so that it is necessary to receive next data even when the memory usage is not sufficiently decreased, and the memory usage resultantly increases as shown in FIG. 17. On the other hand, if the interval is longer than normal, the read time also becomes longer. In this case, the memory usage cannot be sufficiently increased even when the next data is received.

Accordingly, if large fluctuation occurs in the intervals, a line obtained by connecting the black solid circles with one another, which represents a read timing of the usage monitoring unit 232, becomes wavy as shown in FIG. 17. Because the above control is performed for the VCXO 223, the VCXO 223 cannot stably extract the clock and causes deterioration in quality of the video data to be reproduced.

Figure 1:
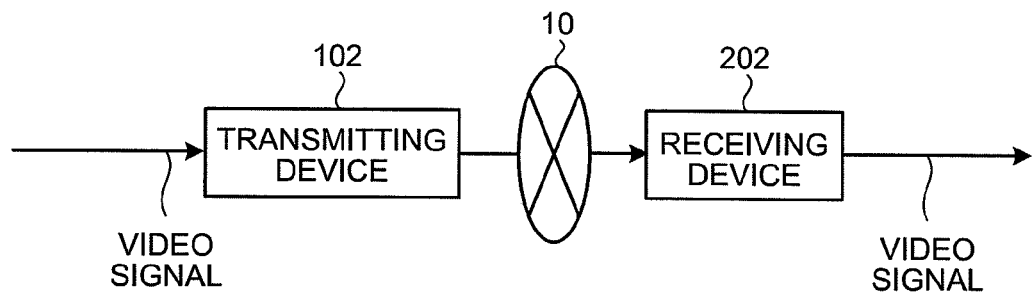
FIG. 1 is a block diagram of a data transmission system according to a first embodiment of the present invention.

A transmitting device and a receiving device according to a first embodiment of the present invention are explained below. FIG. 1 is a block diagram of a data transmission system according to the first embodiment. The data transmission system includes a transmitting device 102 and a receiving device 202 that are connected via the network 10. In this data transmission system, it is possible to transmit video data from the transmitting device 102 to the receiving device 202 and play the video data in real time.

Figure 2:
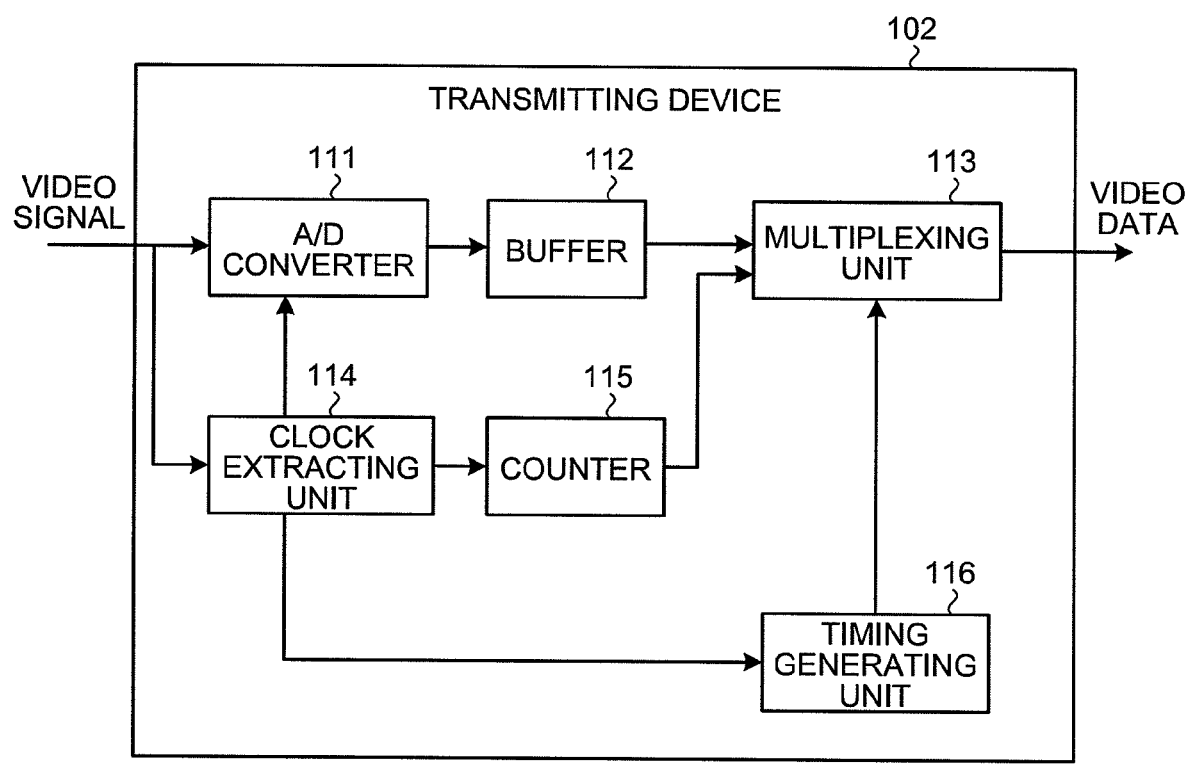
FIG. 2 is a block diagram of a transmitting device shown in FIG. 1.

FIG. 2 is a block diagram of the transmitting device 102. The transmitting device 102 converts a video signal into video data and transmits the video data to the receiving device 202 via the network 10. The transmitting device 102, in substantially the same manner as the transmitting device 100, multiplexes time information on the video data and transmits the time information multiplexed video data to the receiving device 202.

Figure 3:
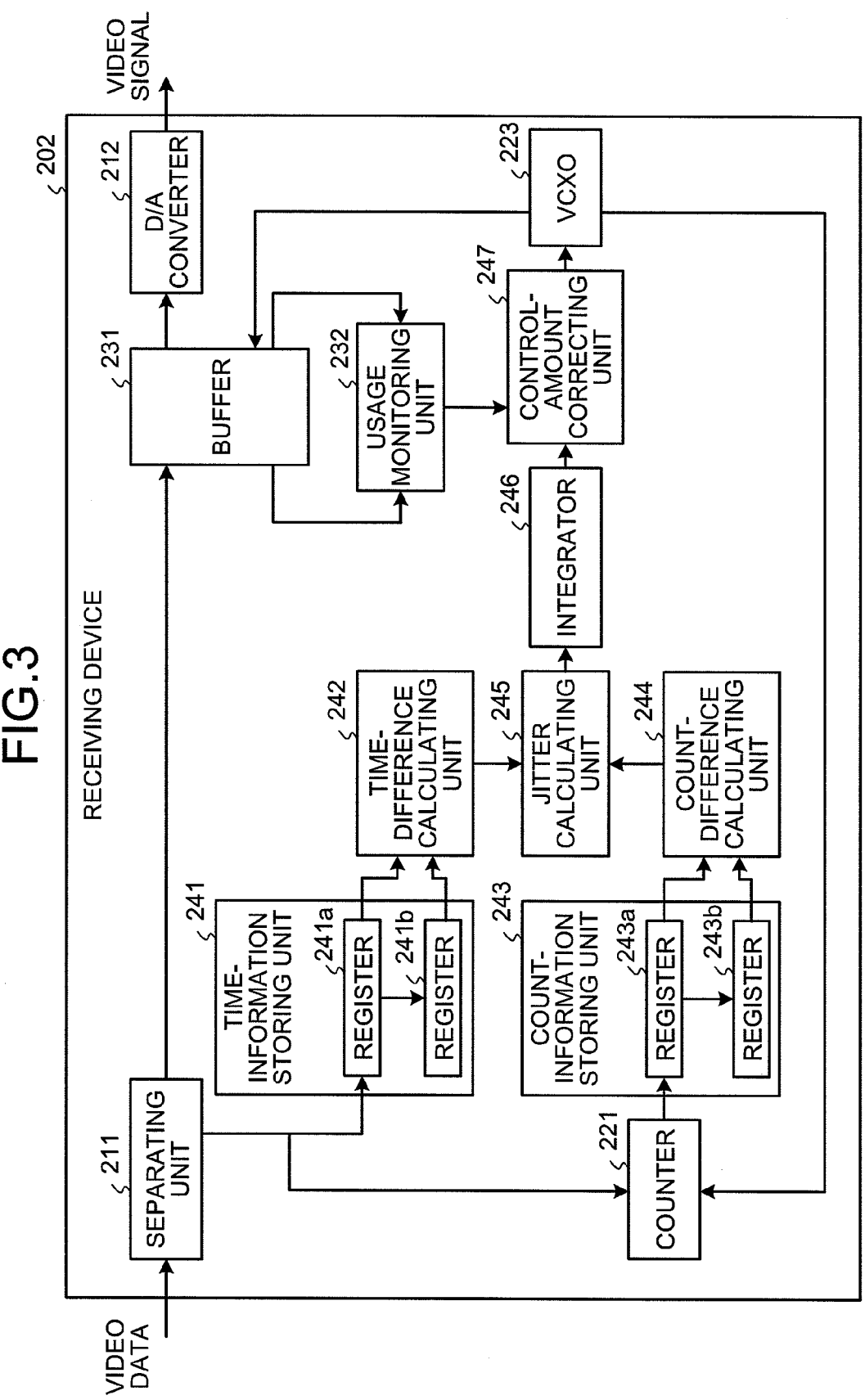
FIG. 3 is a block diagram of a receiving device shown in FIG. 1.

FIG. 3 is a block diagram of the receiving device 202. The receiving device 202 includes the separating unit 211, the D/A converter 212, the counter 221, the VCXO 223, the buffer 231, the usage monitoring unit 232, a time-information storing unit 241, a time-difference calculating unit 242, a count-information storing unit 243, a count-difference calculating unit 244, a jitter calculating unit 245, an integrator 246, and a control-amount correcting unit 247.

The separating unit 211 separates the video data and the time information from the time information multiplexed video data received from the transmitting device 102. The buffer 231 temporarily stores therein the video data, and transmits the video data to the D/A converter 212 in the first-in, first-out method at a rate based on the clock provided by the VCXO 223.

The D/A converter 212 converts the digital video data into an analogue video signal. The usage monitoring unit 232 monitors an amount of video data input into the buffer 231 and an amount of video data output from the buffer 231, and controls the VCXO 223 to keep the amount of the video data stored in the buffer 231 constant.

The VCXO 223 is a clock generator capable of generating a clock of desired frequency within a predetermined range of frequencies. The VCXO 223 inputs the generated clock to the D/A converter 212 and to the counter 221. Based on the clock, the D/A converter 212 reproduces the video signal, while the counter 221 synchronizes its own clock.

The counter 221 increments a count value every time it receives a clock from the VCXO 223. When the counter 221 receives a notice of separation, indicative of completion of separation of time information from video data, from the separating unit 211, the counter 221 notifies the current count value to the count-information storing unit 243.

The time-information storing unit 241 includes a register 241a that stores therein latest time information, and a register 241b that stores therein second latest time information. The time-difference calculating unit 242 calculates a difference between the values stored in the register 241a and the register 241b. The difference represents a difference between times when the above two consecutive pieces of time information are transmitted by the transmitting device 102, in units of clock.

The count-information storing unit 243 includes a register 243a that stores therein latest count information, and a register 243b that stores therein second latest count information. The count-difference calculating unit 244 calculates a difference between the values stored in the register 243a and the register 243b. The difference represents a difference between times when the above two consecutive pieces of count information are received by the receiving device 202, in units of clock.

The jitter calculating unit 245 calculates jitter in a data transmission, based on the differences calculated by the time-difference calculating unit 242 and the count-difference calculating unit 244. The integrator 246 is a circuit that accumulates the jitter obtained by the jitter calculating unit 245. The control-amount correcting unit 247 corrects the VCXO 223 so that a value obtained by subtracting the jitter accumulated in the integrator 246 from the memory usage of the buffer 231 acquired by the usage monitoring unit 232 becomes constant.

An operation of acquiring the jitter by the jitter calculating unit 245 is explained in detail below. When there is no jitter, i.e., when the clocks of the transmitting device 102 and the receiving device 202 are accurately synchronized with each other, the differences calculated by the time-difference calculating unit 242 and the count-difference calculating unit 244 have same values. In other words, when the differences have different values, it means:

(1) there is jitter, and/or
(2) the clocks of the transmitting device 102 and the receiving device 202 are not synchronized.

Figure 4:
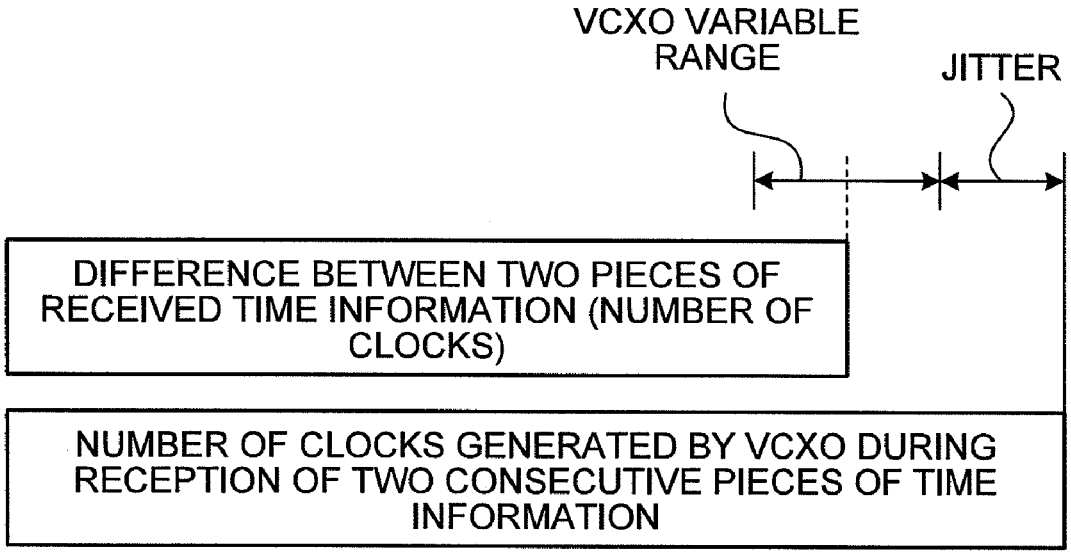
FIG. 4 is a schematic diagram for explaining a concept of a clock correction method according to the first embodiment.
Figure 5:
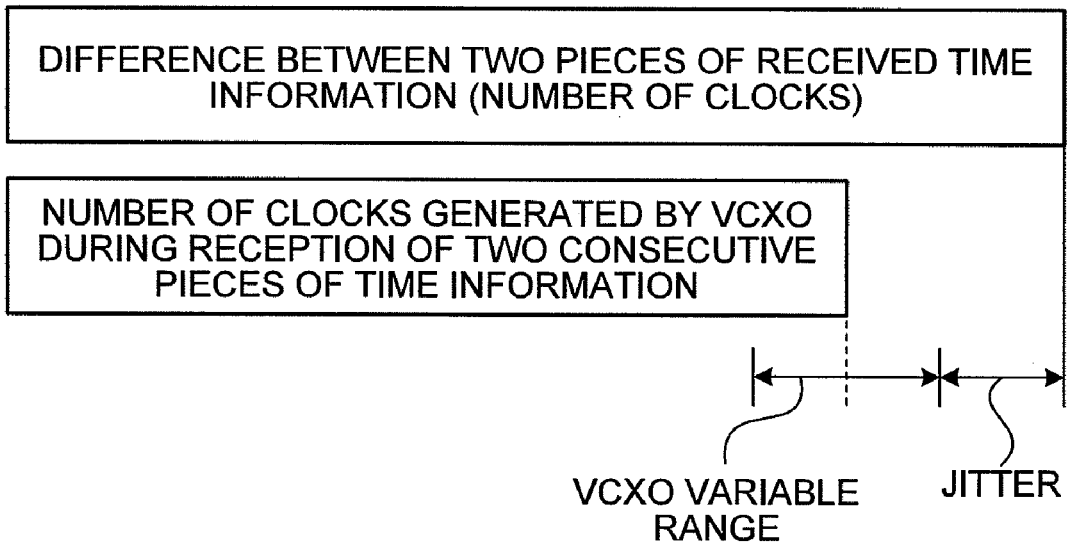
FIG. 5 is a schematic diagram for explaining the concept of the clock correction method according to the first embodiment.

As for (2), the difference between the clock of the transmitting device 102 and the clock of the receiving device 202 is within a variable range of the VCXO 223 that generates a clock of the receiving device 202, so that the difference between those clocks causes the difference between the calculation results of the time-difference calculating unit 242 and the count-difference calculating unit 244 within a predetermined range. Therefore, as shown in FIGS. 4 and 5, it is possible to determine that the jitter in the data transmission causes the difference where the difference between the calculation results of the time-difference calculating unit 242 and the count-difference calculating unit 244 exceeds a variable range of the VCXO 223.

A concrete example is given below. Assume that 270,000-bit video data is transmitted every 10 milliseconds (ms) from the transmitting device 102 to the receiving device 202. Moreover, assume that a sampling clock of the transmitting device 102 is 27 megahertz (MHz)±0 ppm, and a variable frequency of the VCXO 223 is 27 MHz±100 ppm. In addition, clocks counted at 27 MHz are set in the time information to be transmitted from the transmitting device 102 to the receiving device 202.

In the above example, the duration of the clock generated by the VCXO 223 is substantially 37 nanoseconds (ns), and it is possible to determine that a variation is substantially in a range between −2.7 clocks and +2.7 clocks per 1 ms. In other words, if the difference between the calculation results of the time-difference calculating unit 242 and the count-difference calculating unit 244 exceeds the range between −2.7 clocks and +2.7 clocks per 1 ms, at least a portion that has exceeded is caused by jitter.

If the difference between the differences calculated by the time-difference calculating unit 242 and the count-difference calculating unit 244 is represented by (A), jitter component in the clocks per 1 ms can be obtained as follows:

(A)−3, when (A)≧3
(A)+3, when (A)≦3
0, when absolute value of (A)<3

In this case, 2.7 is replaced with 3 that is an integer larger than 2.7 and that satisfies the above condition.

By converting the jitter component, which is obtained in the clocks per predetermined time in the above manner, into the data amount, the jitter calculating unit 245 calculates the jitter. Generally, because 1-bit video data is transmitted every 1 clock, a value obtained by subtracting a variable value of the VCXO 223 from the difference between the differences calculated by the time-difference calculating unit 242 and the count-difference calculating unit 244 is determined to be the jitter.

As described above, in the receiving device 202, the control-amount correcting unit 247 subtracts jitter from the memory usage of the buffer 231 to determine the control amount of the VCXO 223. Therefore, it is possible to reduce effect of the jitter and to reproduce data in a desired quality, compared to a case in which the control amount of the VCXO 223 is determined simply based on the memory usage.

In the method of correcting the clock at a receiving side based on the memory usage, the clock may fluctuate due to a packet loss caused by failure or the like, in addition to the jitter in the network line. This is because the memory usage decreases from a desired usage when there is packet loss. A configuration to prevent a fluctuation of the clock caused by the packet loss is described below in a second embodiment of the present invention.

Figure 6:
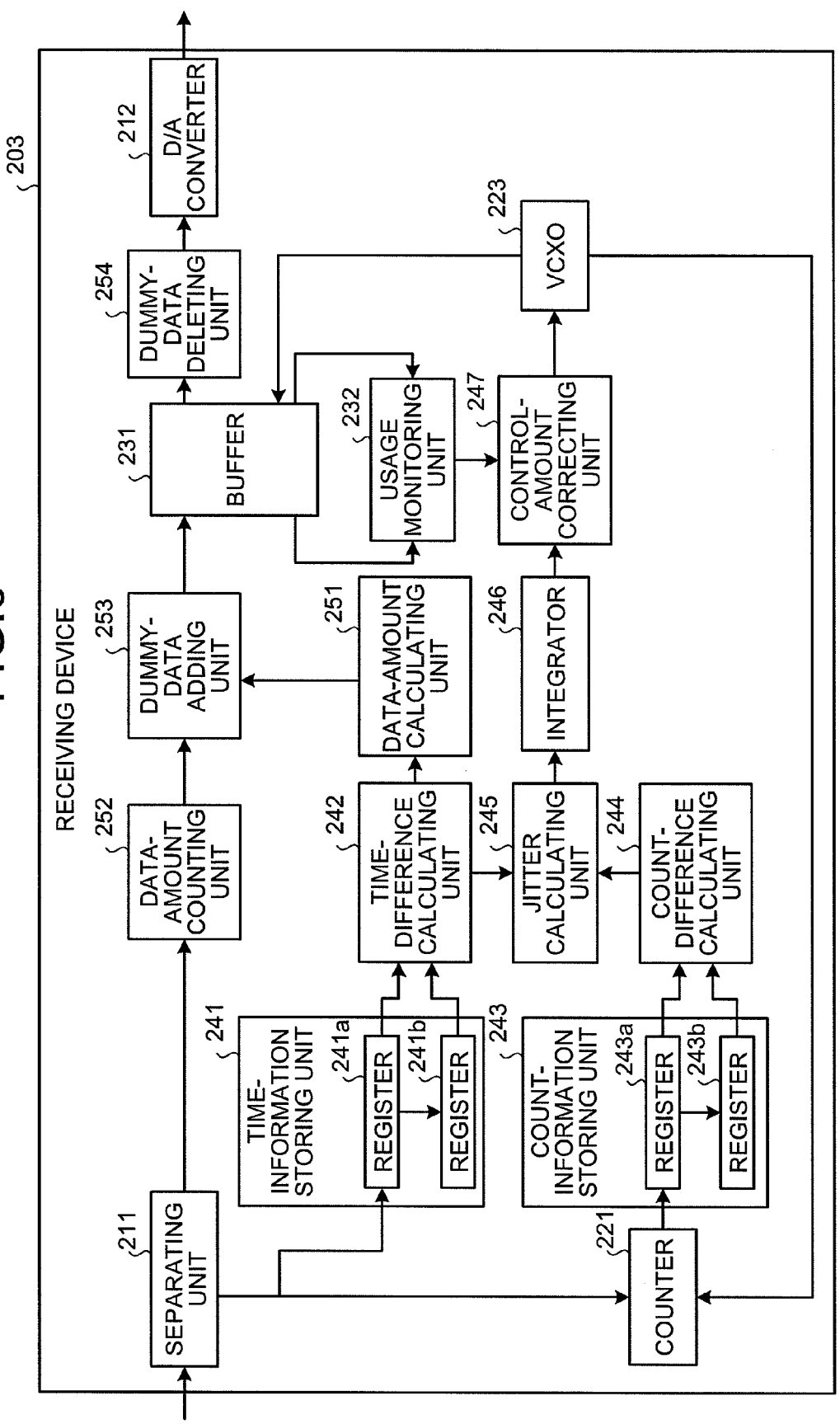
FIG. 6 is a block diagram of a receiving device according to a second embodiment of the present invention.

FIG. 6 is a block diagram of a receiving device 203 according to the second embodiment. The receiving device 203 receives video data transmitted from the transmitting device 102, converts the video data into a video signal, and outputs the video signal, similarly to the receiving device 202. As shown in FIG. 6, the receiving device 203 includes a data-amount calculating unit 251, a data-amount counting unit 252, a dummy-data adding unit 253, and a dummy-data deleting unit 254, in addition to a configuration of the receiving device 202 shown in FIG. 3.

The data-amount calculating unit 251 calculates an amount of video data to be received while two consecutive pieces of the time information stored in the time-information storing unit 241 are received by the receiving device 203, based on a calculation result obtained by the time-difference calculating unit 242. The data-amount counting unit 252 counts an amount of video data actually received by the receiving device 203 while two consecutive pieces of the time information stored in the time-information storing unit 241 are received by the receiving device 203.

The dummy-data adding unit 253 compares the data amount calculated by the data-amount calculating unit 251 with the data amount counted by the data-amount counting unit 252. When the data amount counted by the data-amount counting unit 252 is smaller than the data amount calculated by the data-amount calculating unit 251, the dummy-data adding unit 253 adds dummy-data, of an amount corresponding to the difference between the two data amounts, into the buffer 231.

By adding the dummy-data into the buffer 231, the data amount that has been lost due to packet loss is compensated, so that it is possible to accurately control the VCXO 223. The dummy-data deleting unit 254 deletes the dummy-data from the dummy-data added video data and inputs the remainder, which is the video data, to the D/A converter 212.

When adding dummy-data in the buffer 231, a special flag or a specific bit pattern can be assigned to the dummy-data, so that the dummy-data can be easily distinguished from the video data in the dummy-data added video data.

As described above, in the receiving device 203, a data amount calculated from received time information is compared with an actually received data amount. When the actually received data amount is smaller than calculated data amount, the dummy-data corresponding to the difference between the two data amounts is added to the video data and the dummy-data added video data written into the buffer 231.

Therefore, it is possible to generate an accurate clock even when a portion of data is lost due to packet loss occurred during a data transmission.

If the difference between the data amount calculated by the data-amount calculating unit 251 and the data amount counted by the data-amount counting unit 252 is smaller than the packet size, the dummy-data adding unit 253 does not add dummy data to the buffer 231. This configuration inhibits addition of dummy data of an amount larger than the packet size to the buffer 231.

A case in which video data is compressed is explained below in a third embodiment of the present invention. When the video data is compressed, the memory usage decreases from a theoretical usage. This is similar to a case where the packet loss occurs. Accordingly, it is difficult to accurately generate a clock at a receiving side without taking a countermeasure. A configuration for counteracting the above problem is described below.

Figure 7:
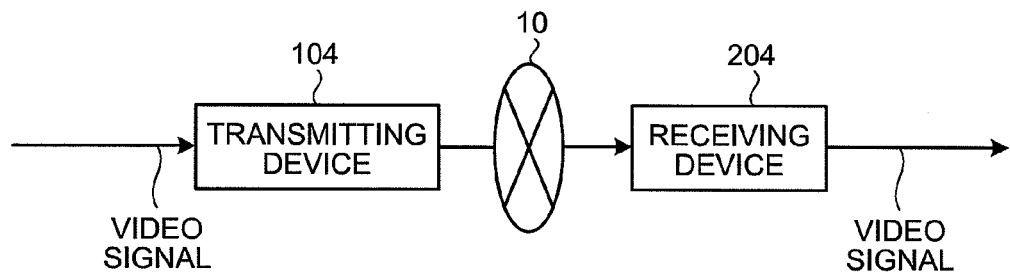
FIG. 7 is a block diagram of a data transmission system according to a third embodiment of the present invention.

FIG. 7 is a block diagram of a data transmission system according to the third embodiment. The data transmission system shown in FIG. 7 includes a transmitting device 104 and a receiving device 204 that are connected via the network 10. In this data transmission system, it is possible to transmit video data from the transmitting device 104 to the receiving device 204 and play the video data in real time. The transmitting device 104 converts an input video signal into video data, compresses the video data, and transmits the compressed video data to the receiving device 204. The receiving device 204 inflates the compressed video data, converts the inflated video data into the video signal, and outputs the video signal to outside.

Figure 8:
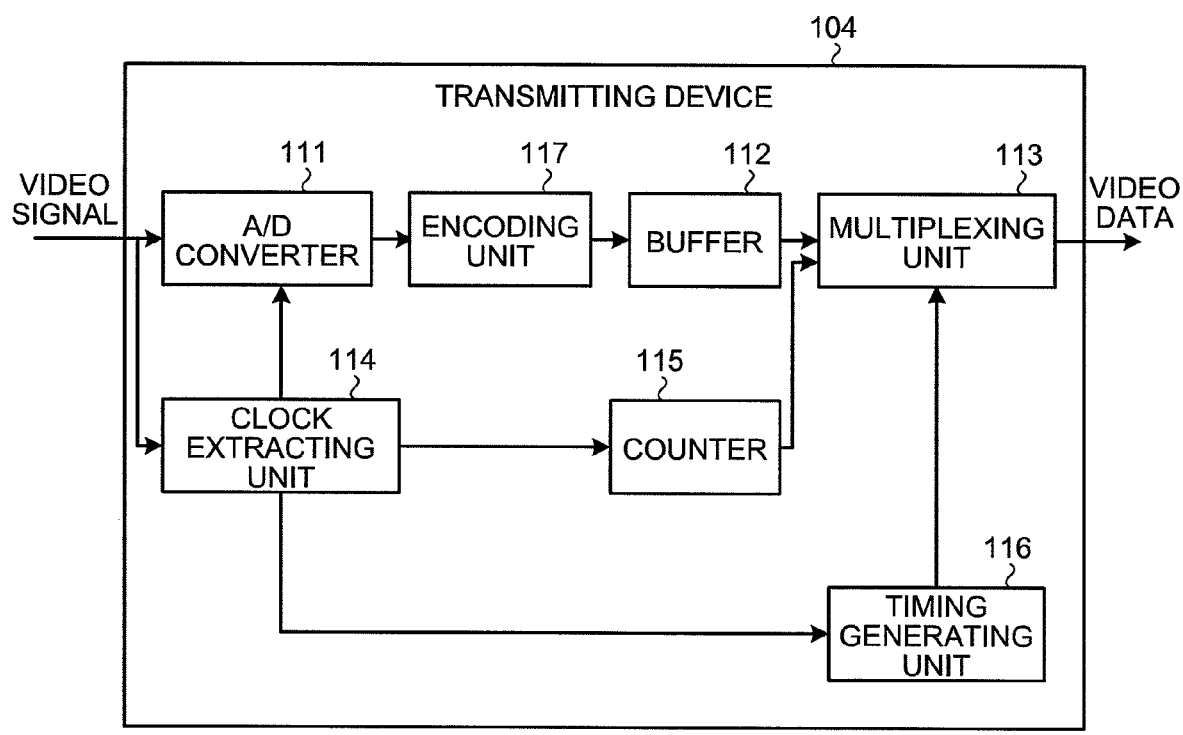
FIG. 8 is a block diagram of a transmitting device shown in FIG. 7.

FIG. 8 is a block diagram of the transmitting device 104. The transmitting device 104 includes an encoding unit 117 in addition to the configuration of the transmitting device 102 shown in FIG. 2. The encoding unit 117 encodes the A/D converted video data thereby compressing the video data, and outputs the compressed video data to the buffer 112. The encoding unit 117 compresses the video data with a constant bit rate.

Figure 9:
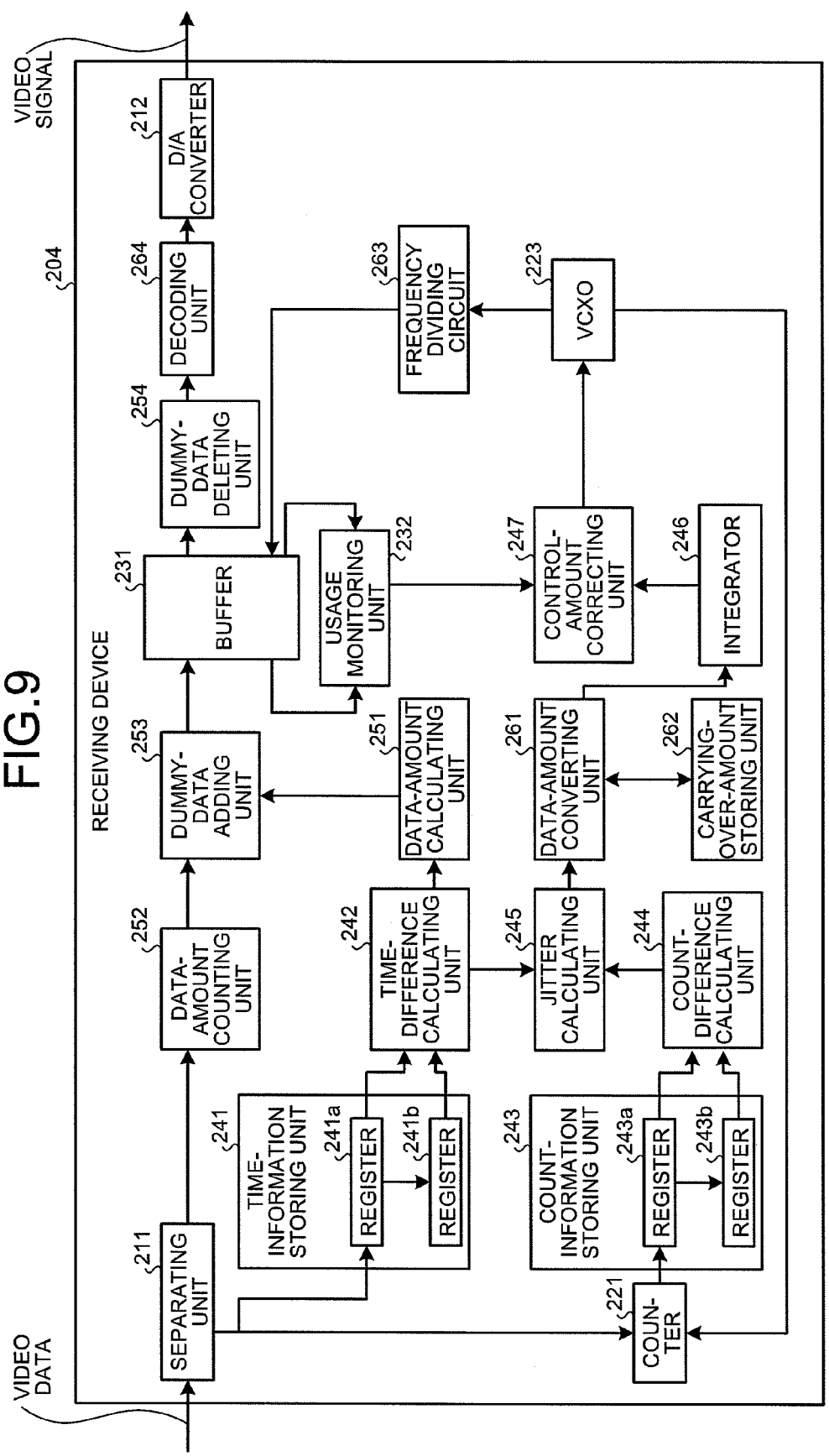
FIG. 9 is a block diagram of a receiving device shown in FIG. 7.

FIG. 9 is a block diagram of the receiving device 204. The receiving device 204 includes the data-amount calculating unit 251, the data-amount counting unit 252, the dummy-data adding unit 253, the dummy-data deleting unit 254, a data-amount converting unit 261, a carrying-over-amount storing unit 262, a frequency dividing circuit 263, and a decoding unit 264, in addition to the configuration of the receiving device 202 shown in FIG. 3.

The data-amount calculating unit 251 calculates an amount of video data to be received while two consecutive pieces of the time information stored in the time-information storing unit 241 are received by the receiving device 204. The data-amount counting unit counts an amount of video data actually received by the receiving device 204 while the two consecutive pieces of the time information stored in the time-information storing unit 241 are received by the receiving device 204.

The data-amount calculating unit 251 calculates the data amount in consideration of the constant bit rate with which the video data is compressed. For example, if the video data is compressed to be one-tenth, the data-amount calculating unit 251 transmits, to the dummy-data adding unit 253, a value compressed to be one-tenth of data amount calculated from a calculation result obtained by the time-difference calculating unit 242.

The dummy-data adding unit 253 compares the data amount calculated by the data-amount calculating unit 251 with the data amount counted by the data-amount counting unit 252. When the data amount counted by the data-amount counting unit 252 is smaller than the data amount calculated by the data-amount calculating unit 251, the dummy-data adding unit 253 adds the dummy-data of an amount corresponding to the difference between the above two data amounts into the buffer 231.

The data amount counted by the data-amount counting unit 252 is the amount of compressed data that has been actually transmitted, while the data amount calculated by the data-amount calculating unit 251 is the amount calculated using the constant bit rate. As a result, the amount of the dummy-data to be inserted into the buffer 231 is also constituted of the constant bit rate.

The dummy-data deleting unit 254 deletes the dummy-data inserted by the dummy-data adding unit 253 before the decoding unit 264 performs a decoding. The data-amount calculating unit 251, the data-amount counting unit 252, the dummy-data adding unit 253, and the dummy-data deleting unit 254 are necessary for a process of complementing a data amount lost due to the packet loss or the like, and not necessary for transmitting compressed video data.

The data-amount converting unit 261 converts the jitter calculated by the jitter calculating unit 245 into a value with the constant bit rate. The carrying-over-amount storing unit 262 stores therein fraction generated when the data-amount converting unit 261 converts the data amount, and reflects the fraction to a next conversion.

The frequency dividing circuit 263 divides a frequency of the clock generated by the VCXO 223, so that the clock is converted into a clock for reading the video data compressed with the constant bit rate. For example, when the video data is compressed to be one-tenth size, the frequency dividing circuit 263 divides the frequency of the clock generated by the VCXO 223 to be one-tenth of the frequency.

In this manner, the clock frequency is divided because the data amount stored in the buffer 231 is decreased due to compression. The decoding unit 264 extracts the video data by decoding the video data after the dummy-data is deleted by the dummy-data deleting unit 254, and outputs extracted video data to the D/A converter 212.

A process of correcting the clock performed by the receiving device 204 is explained in detail below. Assume that 27,000-bit data obtained by compressing the 270,000-bit video data is transmitted every 10 ms from the transmitting device 104 to the receiving device 204. Moreover, assume that a sampling clock of the transmitting device 104 is 27 MHz±0 ppm, a variable frequency of the VCXO 223 is 27 MHz±100 ppm, and a bit rate for encoding is $\frac{1}{10}$. In addition, the clocks counted at 27 MHz are set in the time information to be transmitted from the transmitting device 104 to the receiving device 204.

In the above example, if the transmitting device 104 transmits the time information every 10 ms, a calculation result obtained by the time-difference calculating unit 242 becomes 270,000. If it is assumed that the calculation result of the count-difference calculating unit 244 is 275,400, a difference between the calculation results of the time-difference calculating unit 242 and the count-difference calculating unit 244 becomes 5,400. Because the variable amount of the VCXP 223 is in a range between −27 clocks and +27 clocks per 10 ms, the output of the jitter calculating unit 245 becomes 5,373.

The constant bit rate for an encoding is reduced to one-tenth, so that the output of the data-amount converting unit 261 becomes 537, of which fractional part of 0.3 is stored in the carrying-over-amount storing unit 262 and reflected in the calculation result of next data by the data-amount converting unit 261.

As described above, in the receiving device 204, the data-amount converting unit 261 converts the jitter calculated by the jitter calculating unit 245 based on the time information into a value with the constant bit rate, and the control amount of the VCXO 223 is determined by correcting the memory usage of the buffer 231 using converted value. Therefore, it is possible to generate an accurate clock and to reproduce the video data in a desired quality even when the video data is compressed with the constant bit rate.

Although a case in which the video data is compressed with the constant bit rate is explained as the third embodiment, another case in which the video data is compressed using a variable bit rate in a fourth embodiment of the present invention.

Figure 10:
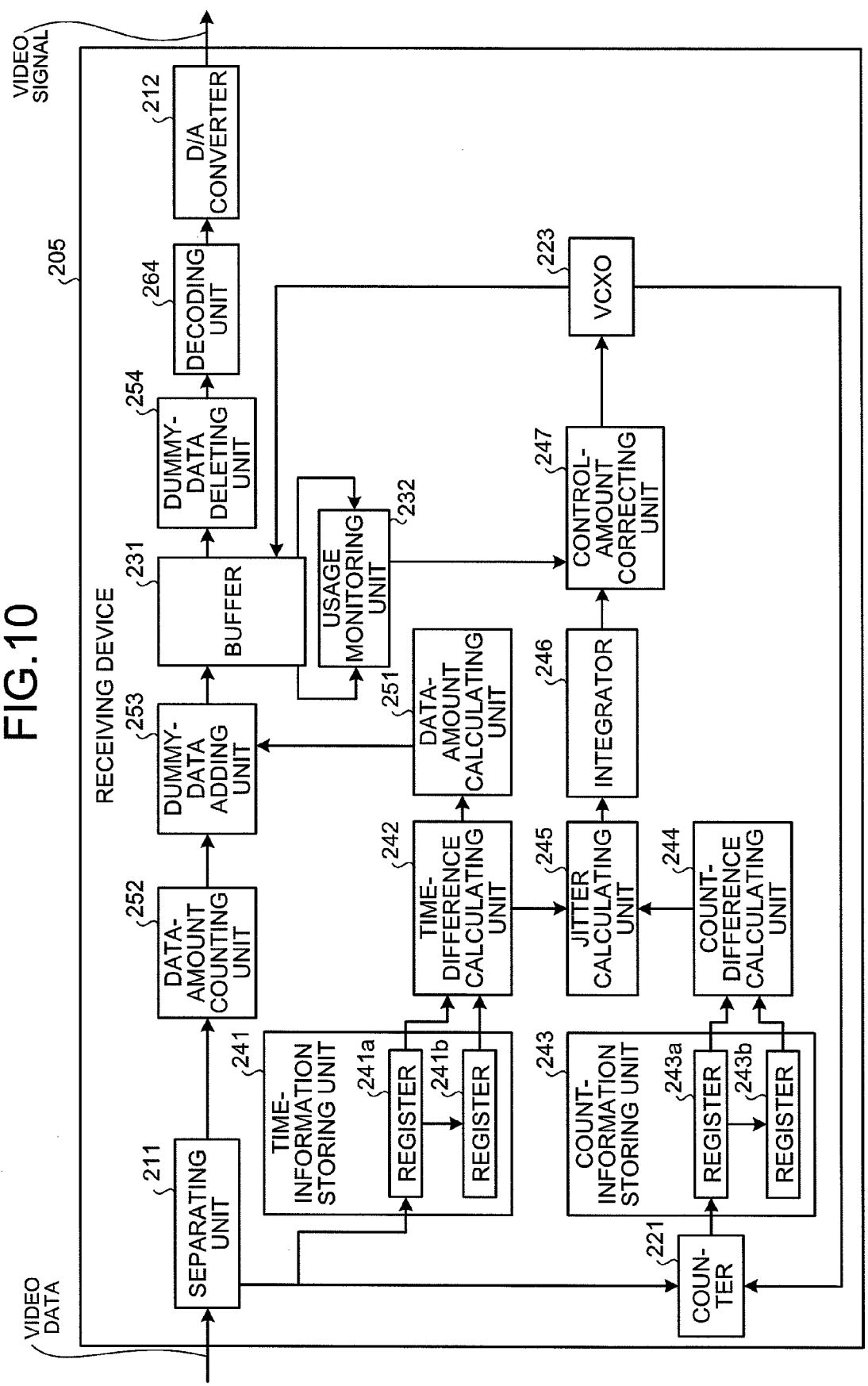
FIG. 10 is a block diagram of a receiving device according to a fourth embodiment of the present invention.

FIG. 10 is a block diagram of a receiving device 205 according to the fourth embodiment. The receiving device 205 includes the data-amount calculating unit 251, the data-amount counting unit 252, the dummy-data adding unit 253, the dummy-data deleting unit 254, and the decoding unit 264, in addition to the configuration of the receiving device 202 shown in FIG. 3.

The data-amount calculating unit 251 calculates an amount of the video data to be received while the two consecutive pieces of the time information stored in the time-information storing unit 241 are received by the receiving device 205. The data-amount counting unit 252 counts the amount of the video data actually received while the two consecutive pieces of the time information stored in the time-information storing unit 241 are received by the receiving device 205. The data-amount calculating unit 251 calculates the data amount without considering the bit rate with which the video data is compressed.

The dummy-data adding unit 253 compares the data amount calculated by the data-amount calculating unit 251 with the data amount counted by the data-amount counting unit 252. When the data amount counted by the data-amount counting unit 252 is smaller than the data amount calculated by the data-amount calculating unit 251, the dummy-data adding unit 253 adds the dummy-data of an amount corresponding to the difference between the above two data amounts into the buffer 231.

The data amount calculated by the data-amount calculating unit 251 is calculated without considering the bit rate, so that the memory usage of the buffer 231 after the dummy-data is inserted becomes the same as that obtained when the video data is not compressed. Therefore, the data amount to be accumulated when the video data is not compressed is continuously maintained in the buffer 231, and the receiving device 205 can continuously generate an accurate clock and reproduce video data in a desired quality regardless of the bit rate with which the video data is compressed at the transmitting side.

Although it is explained that same data amount as that when the video data is not compressed is continuously accumulated in the buffer 231, it is possible to configure that arbitrary amount equal to or larger than an expected received data rate is continuously accumulated in the buffer 231. Furthermore, the configuration of the receiving device 205 is suitable not only for a case in which the video data is compressed with the variable bit rate but also for a case in which the bit rate for compressing the video data is not apparent.

Although the transmitting device and the receiving device are separately provided in the configurations described in the above embodiments, it is possible to realize a device that includes the configurations of the transmitting device and the receiving device, so that the device can serve as the transmitting device and the receiving device simultaneously.

According to an aspect of the present invention, in the receiving device, the control-amount correcting unit subtracts the jitter calculated by the jitter calculating unit based on the time information from the memory usage of the buffer that stores therein multimedia data to determine the control amount of a clock generating unit. Therefore, it is possible to reduce a jitter effect in the network and to reproduce the multimedia data in a desired quality.

Furthermore, according to another aspect of the present invention, the receiving device compares a data amount calculated from received time information with an actually received data amount, so that, when the actually received data amount is smaller than calculated data amount, dummy-data corresponding to a difference between the data amounts into the buffer 231 is added into the buffer 231. Therefore, it is possible to generate an accurate clock even when a portion of data is lost due to the packet loss occurred during a data transmission and to produce the multimedia data in a desired quality.

Moreover, according to still another aspect of the present invention, the receiving unit is configured in such a manner that the data-amount converting unit converts the jitter calculated by the jitter calculating unit based on the time information into a value with the constant bit rate, and the control amount of the clock generating unit is determined by correcting the memory usage of the buffer based on a converted value. Therefore, it is possible to generate an accurate clock and to reproduce the multimedia data in a desired quality even when the multimedia data is compressed with the constant bit rate.

Furthermore, according to still another aspect of the present invention, the receiving device compares the data amount of the multimedia data calculated as an amount compressed with a predetermined bit rate with actually received data amount based on the received time information, so that, when the actually received data amount is smaller than calculated data amount, dummy-data with an amount corresponding to a difference between the two amounts into the buffer. Therefore, it is possible to generate an accurate clock and to reproduce the multimedia data in a desired quality even when the multimedia data is compressed with a variable bit rate in the transmitting device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A receiving device that receives multiplexed multimedia data including multimedia data multiplexed on time information from a transmitting device via a network and reproduces the multimedia data in real time, the receiving device comprising:
 a clock generating unit that generates a clock;
 a buffer that temporarily stores therein the received multiplexed multimedia data;
 a first difference-calculating unit that calculates a first difference between timings of two consecutive pieces of time information included in the received multiplexed multimedia data;
 a second difference-calculating unit that calculates a second difference between receiving timings of two con- secutive pieces of count information corresponding to two consecutive pieces of time information received at the receiving device;

a jitter calculating unit that calculates a jitter in the network, by subtracting an amount of data variation caused by a variation of the clock generated by the clock generating unit from a data amount of the multimedia data received in a period, the period corresponding to a third difference between the first difference and the second difference;

a data-amount calculating unit that calculates a first data amount indicative of the multiplexed multimedia data to be received in a period corresponding to the first difference;

a data-amount counting unit that counts a second data amount indicative of the multiplexed multimedia data that has been actually received while the two consecutive pieces of the count information are received;

a dummy-data adding unit that, when the second data amount is smaller than the first data amount, adds dummy-data of an amount corresponding to a difference between the first data amount and the second data amount to the buffer;

a dummy-data deleting unit that deletes the dummy-data from an output of the buffer; and a control unit that subtracts a data amount corresponding to the jitter from a data amount including the dummy-data accumulated in the buffer, and controls the clock generating unit to keep constant a value obtained by subtracting the data amount corresponding to the jitter from the data amount including the dummy-data accumulated in the buffer.

2. The receiving device according to claim 1, wherein the multiplexed multimedia data is compressed data that is compressed at a fixed bit rate, and the receiving device further comprising a data-amount converting unit that converts the jitter at a same ratio as that of the fixed bit rate.

3. A receiving device that receives multiplexed multimedia data including multimedia data multiplexed on time information from a transmitting device via a network and reproduces the multimedia data in real time, the receiving device comprising:

a clock generating unit that generates a clock;

a buffer that temporarily stores therein the received multiplexed multimedia data;

a first difference-calculating unit that calculates a first difference between timings of two consecutive pieces of time information included in the received multiplexed multimedia data;

a second difference-calculating unit that calculates a second difference between receiving timings of two consecutive pieces of count information corresponding to two consecutive pieces of time information received at the receiving device;

a jitter calculating unit that calculates a jitter in the network, by subtracting an amount of data variation caused by a variation of the clock generated by the clock generating unit from a data amount of the multimedia data received in a period, the period corresponding to a third difference between the first difference and the second difference;

a data-amount calculating unit that calculates a first data amount indicative of the multiplexed multimedia data to be received in a period corresponding to the first difference;

a data-amount counting unit that counts a second data amount indicative of the multiplexed multimedia data that has been actually received while the two consecutive pieces of the count information are received;

a dummy-data adding unit that, when the second data amount is smaller than the first data amount, adds dummy-data of an amount corresponding to a difference between the first data amount and the second data amount to the buffer;

a dummy-data deleting unit that deletes the dummy-data from an output of the buffer; and a control unit that subtracts a data amount corresponding to the jitter from a data amount including the dummy-data accumulated in the buffer, and controls the clock generating unit to keep constant a value obtained by subtracting the data amount corresponding to the jitter from the data amount including the dummy-data accumulated in the buffer, wherein the multiplexed multimedia data is compressed data that is compressed at a predetermined bit rate.

4. A method of receiving multiplexed multimedia data, including multimedia data multiplexed on time information, at a receiving device from a transmitting device via a network, and reproducing the multimedia data in real time at the receiving device, the method comprising:

generating a clock by a clock generating unit;

temporarily storing the received multiplexed multimedia data in a buffer;

calculating a first difference between timings of two consecutive pieces of time information included in the received multiplexed multimedia data;

calculating a second difference between receiving timings of two consecutive pieces of count information corresponding to two consecutive pieces of time information received at the receiving device;

calculating a jitter in the network, by subtracting an amount of data variation caused by a variation of the clock generated by the clock generating unit from a data amount of the multimedia data received in a period, the period corresponding to a third difference between the first difference and the second difference;

calculating a first data amount indicative of the multiplexed multimedia data to be received in a period corresponding to the first difference;

counting a second data amount indicative of the multiplexed multimedia data that has been actually received while the two consecutive pieces of the count information are received;

adding dummy-data, when the second data amount is smaller than the first data amount, of an amount corresponding to a difference between the first data amount and the second data amount to the buffer;

subtracting a data amount corresponding to the jitter from a data amount including the dummy-data accumulated in the buffer;

controlling the clock generating unit to keep constant a value obtained at the subtracting; and deleting the dummy-data from an output of the buffer.

5. The method according to claim 4, wherein the multiplexed multimedia data is compressed data compressed at a fixed bit rate, and the method further comprising converting the jitter at a same ratio as that of the fixed bit rate.

6. A method of receiving multiplexed multimedia data, including multimedia data multiplexed on time information, at a receiving device from a transmitting device via a network, and reproducing the multimedia data in real time at the receiving device, the method comprising:

generating a clock by a clock generating unit;

temporarily storing the received multiplexed multimedia data in a buffer;

calculating a first difference between timings of two consecutive pieces of time information included in the received multiplexed multimedia data;

calculating a second difference between receiving timings of two consecutive pieces of count information corresponding to two consecutive pieces of time information received at the receiving device;

calculating a jitter in the network, by subtracting an amount of data variation caused by a variation of the clock generated by the clock generating unit from a data amount of the multimedia data received in a period, the period corresponding to a third difference between the first difference and the second difference;

calculating a first data amount indicative of the multiplexed multimedia data, the data to be received in a period corresponding to the first difference;

counting a second data amount indicative of the multiplexed multimedia data that has been actually received while the two consecutive pieces of the count information are received;

adding dummy-data, when the second data amount is smaller than the first data amount, of an amount corresponding to a difference between the first data amount and the second data amount to the buffer;

subtracting a data amount corresponding to the jitter from a data amount including the dummy-data accumulated in the buffer;

controlling the clock generating unit to keep constant a value obtained at the subtracting; and deleting the dummy-data from an output of the buffer, wherein the multiplexed multimedia data is compressed data compressed at a predetermined bit rate.

7. A non-transitory computer-readable recording medium that stores therein a computer program that causes a computer to realize receiving multiplexed multimedia data, including multimedia data multiplexed on time information, at a receiving device from a transmitting device via a network, and reproducing the multimedia data in real time at the receiving device, the computer program causing the computer to execute:

generating a clock by a clock generating unit;

temporarily storing the received multiplexed multimedia data in a buffer;

calculating a first difference between timings of two consecutive pieces of time information included in the received multiplexed multimedia data;

calculating a second difference between receiving timings of two consecutive pieces of count information corresponding to two consecutive pieces of time information received at the receiving device;

calculating a jitter in the network, by subtracting an amount of data variation caused by a variation of the clock generated by the clock generating unit from a data amount of the multimedia data received in a period, the period corresponding to a third difference between the first difference and the second difference;

calculating a first data amount indicative of the multiplexed multimedia data to be received in a period corresponding to the first difference;

counting a second data amount indicative of the multiplexed multimedia data that has been actually received while the two consecutive pieces of the count information are received;

adding dummy-data, when the second data amount is smaller than the first data amount, of an amount corresponding to a difference between the first data amount and the second data amount to the buffer;

subtracting a data amount corresponding to the jitter from a data amount including the dummy-data accumulated in the buffer;

controlling the clock generating unit to keep constant a value obtained at the subtracting; and deleting the dummy-data from an output of the buffer.

8. A non-transitory computer-readable recording medium that stores therein a computer program that causes a computer to realize receiving multiplexed multimedia data, including multimedia data multiplexed on time information, at a receiving device from a transmitting device via a network, and reproducing the multimedia data in real time at the receiving device, the computer program causing the computer to execute:

generating a clock by a clock generating unit;

temporarily storing the received multiplexed multimedia data in a buffer;

calculating a first difference between timings of two consecutive pieces of time information included in the received multiplexed multimedia data;

calculating a second difference between receiving timings of two consecutive pieces of count information corresponding to two consecutive pieces of time information received at the receiving device;

calculating a jitter in the network, by subtracting an amount of data variation caused by a variation of the clock generated by the clock generating unit from a data amount of the multimedia data received in a period, the period corresponding to a third difference between the first difference and the second difference;

calculating a first data amount indicative of the multiplexed multimedia data to be received in a period corresponding to the first difference;

counting a second data amount indicative of the multiplexed multimedia data that has been actually received while the two consecutive pieces of the count information are received;

adding dummy-data, when the second data amount is smaller than the first data amount, of an amount corresponding to a difference between the first data amount and the second data amount to the buffer;

subtracting a data amount corresponding to the jitter from a data amount including the dummy-data accumulated in the buffer;

controlling the clock generating unit to keep constant a value obtained at the subtracting; and deleting the dummy-data from an output of the buffer, wherein the multiplexed multimedia data is compressed data compressed at a predetermined bit rate.

* * * * *